Figure 1:
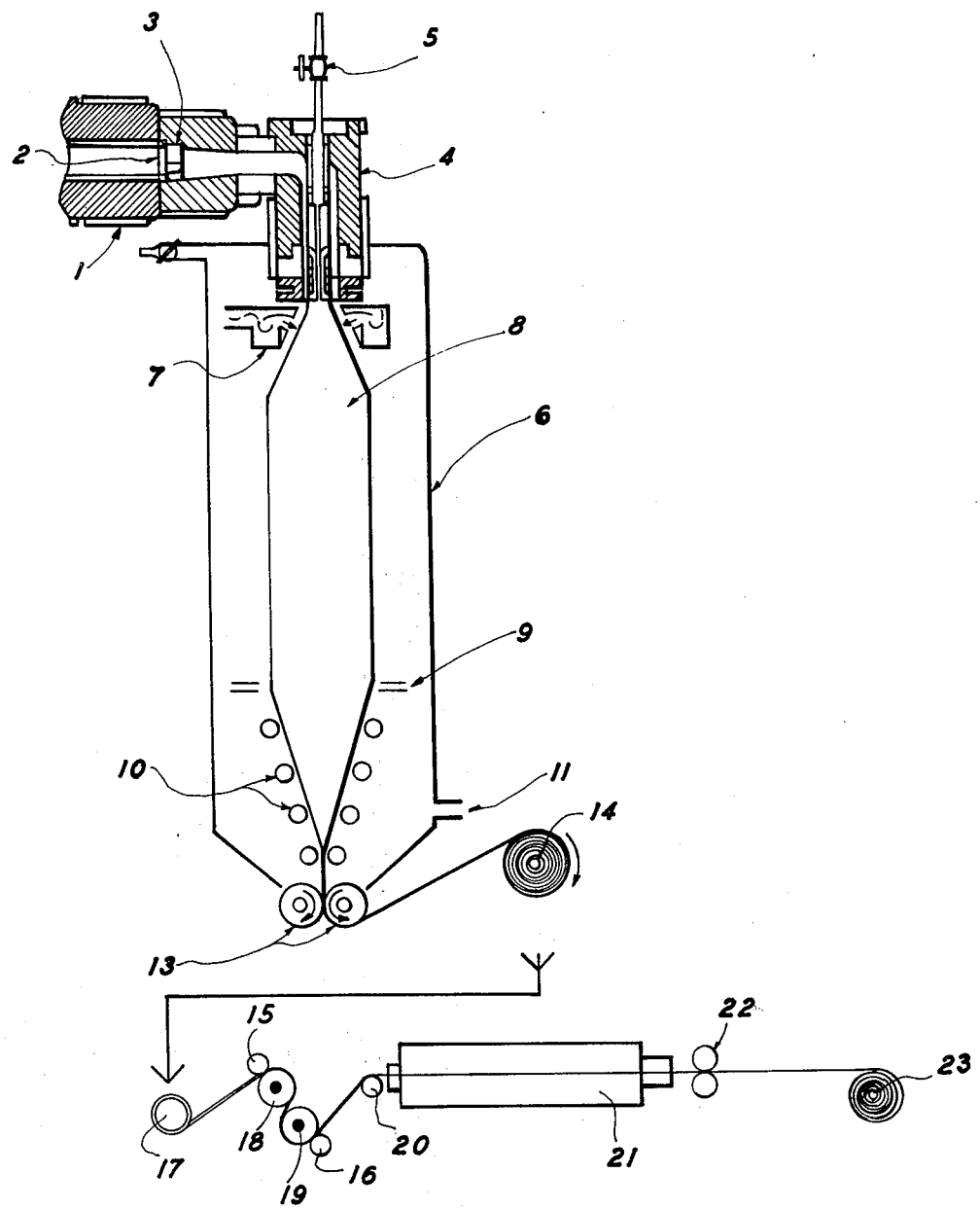

United States Patent [19]

Zwick

[11] 4,301,112
[45] Nov. 17, 1981

[54] PROCESS FOR BIAXIALLY ORIENTED ACRYLONITRILE POLYMER BARRIER FILM

[75] Inventor: Maurice M. Zwick, Stamford, Conn.

[73] Assignee: American Cyanamid Company, Stamford, Conn.

[21] Appl. No.: 148,645

[22] Filed: May 12, 1980

[51] Int. Cl.³ .......................... B29D 7/06; D01F 1/02
[52] U.S. Cl. ................................. 264/564; 264/565; 264/211
[58] Field of Search ....................... 264/564, 565, 211

[56] References Cited

U.S. PATENT DOCUMENTS

| | | | |
|---|---|---|---|
| 2,876,497 | 3/1959 | Alexander | 264/564 X |
| 3,170,011 | 2/1965 | Cheney et al. | 264/564 |
| 3,260,776 | 7/1966 | Lindstrom et al. | 264/129 X |
| 3,275,612 | 9/1966 | Bechtold | 264/216 X |
| 3,313,870 | 4/1967 | Yazawa | 264/565 X |
| 3,418,406 | 12/1968 | Ball | 264/216 X |
| 3,426,113 | 2/1969 | Yazawa | 264/40.3 X |
| 3,649,731 | 3/1972 | Cronin | 264/564 X |
| 3,671,617 | 6/1972 | Nagase | 264/565 |
| 3,991,153 | 11/1976 | Klausner et al. | 264/211 |
| 4,015,033 | 3/1977 | Nield | 264/564 X |
| 4,066,731 | 1/1978 | Hungerford | 264/216 |
| 4,174,932 | 11/1979 | Herrington | 264/564 X |

Primary Examiner—Philip Anderson
Attorney, Agent, or Firm—Frank M. Van Riet

[57] ABSTRACT

Extrusion of a homogeneous single phase fusion melt of acrylonitrile polymer and water through a circular die into a steam-pressurized solidification zone enables the tubular film formed to be drawn longitudinally and expanded transversely to provide a biaxially oriented barrier film especially suitable for food wrapping.

10 Claims, 3 Drawing Figures

PROCESS FOR BIAXIALLY ORIENTED ACRYLONITRILE POLYMER BARRIER FILM

This invention relates to a novel process for preparing biaxially oriented acrylonitrile polymer film. More particularly, this invention relates to such a process wherein a single phase fusion melt of acrylonitrile polymer and water is extruded through a circular tubular film forming die directly into a steam-pressurized solidification zone wherein the nascent film is drawn in the extruded direction and blown with steam and air to expand in the transverse direction and thus provide biaxial orientation while the nascent film remains within the solidification zone.

In the past, acrylonitrile polymers having high acrylonitrile content, i.e., 68 to 93 weight percent, have not been widely utilized in film form because of their inability to melt without decomposition. As a result, the conventional hot melt extrusion techniques were not applicable. It was found, however, that such polymers could be formed into film in processes which require dissolving the polymer in a suitable polymer solvent, extruding the polymer solution in film form into a suitable coagulant for the polymer, and washing, stretching, and drying the resulting film. It was necessary to form the film on a suitable film supporting surface. Typical processes are illustrated, for example, in U.S. Pat. Nos. 3,275,612; 3,418,406; and 4,066,731. Because of the large volumes of solvent required in such processes, it is necessary to provide solvent recovery systems to prevent environmental pollution and to economize solvent expenditures. Because of the necessity for solvent recovery systems, these film-forming processes are unattractive and alternative processes which overcome such deficiencies are sought.

While it was also discovered in the past that polymers having acrylonitrile contents in the narrow range of 70 to 74 weight percent were thermoformable in the temperature range of 200°–220° C. provided that processing conditions of low shear and productivity were observed, it had not been possible under such conditions to provide the necessary extrudate drawing to obtain films of 1–10 mil thickness necessary for utility as barrier films. Consequently, these polymers could only be used to form bottles and other molded containers.

Recent developments in the field of acrylonitrile polymers are described for instance in U.S. Pat. Nos. 3,984,601 and 4,094,948 have led to the observation that a single phase melt of acrylonitrile polymer and water could be formed into film by extruding such a melt through a film-forming die directly into air or other drying medium. The resulting film, however, had poor structure and physical properties, was opaque due to void structure and was not useful in barrier film applications.

What is needed, therefore, is a process for preparing barrier films of acrylonitrile polymer of high acrylonitrile content which avoids the use of polymer solvent, provides void free film of desirable physical properties and avoids the presence of undesirable contaminants in the final film, such as residual monomer or solvent. The provision for such a process would satisfy a long-felt need and constitute a significant advance in the art.

In accordance with the present invention, there is provided a process for preparing a biaxially oriented barrier film which comprises preparing a single phase fusion melt of an acrylonitrile polymer and water, said polymer being composed of repeating units derived from about 68 to 93 weight percent acrylonitrile and, correspondingly, from about 32 to 7 weight percent of one or more monomers copolymerizable with acrylonitrile and may contain as much as about 10 parts per million of free residual monomer or more; extruding said melt through a circular die to form a tubular film, said extruding being directly into a stream pressurized solidification zone maintained under conditions of saturation, pressure, and temperature which control the rate of release of water from the nascent film; introducing steam and/or air under pressure into the tubular film structure as it is formed by the die to expand and stretch the nascent film in the transverse direction while drawing the film in the longitudinal direction so as to provide biaxial orientation while the film remains within the solidification zone; flattening the stretched film for removal from the solidification zone; and removing the flattened film from the solidification zone, said film having a free monomer content substantially less than that of the acrylonitrile polymer employed if at all detectable.

The process of the present invention provides a barrier film of excellent physical properties which is substantially free of undesirable unreacted monomer and is useful in applications involving handling and storage of foodstuffs and pharmaceuticals. The films have low permeability to oxygen, carbon dioxide, and water vapor due to their high acrylonitrile content, permeability decreasing with increasing acrylonitrile content. The process is readily carried out in continuous fashion and overcomes those deficiencies associated with prior procedures.

Figure 2:
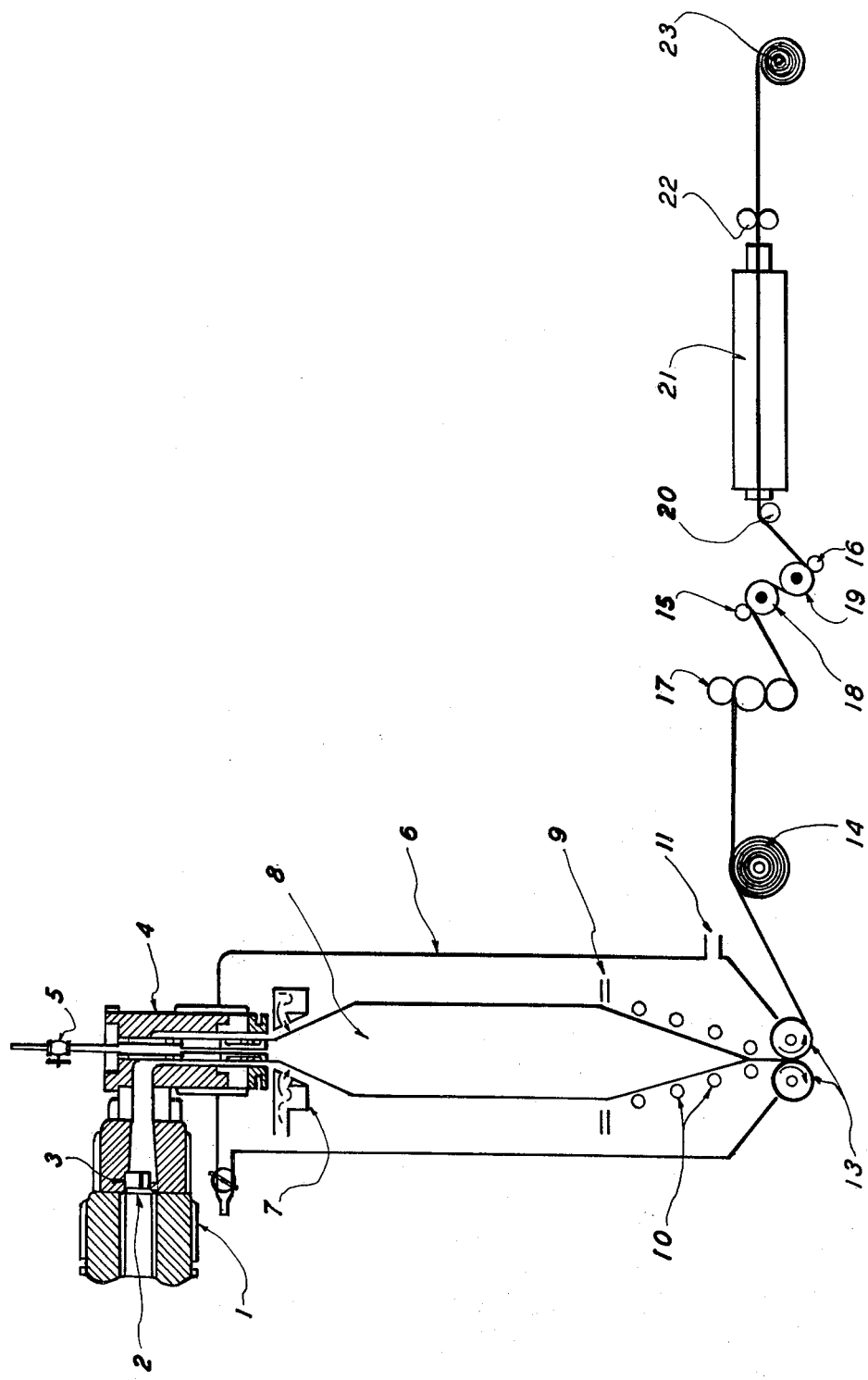
Figure 3:
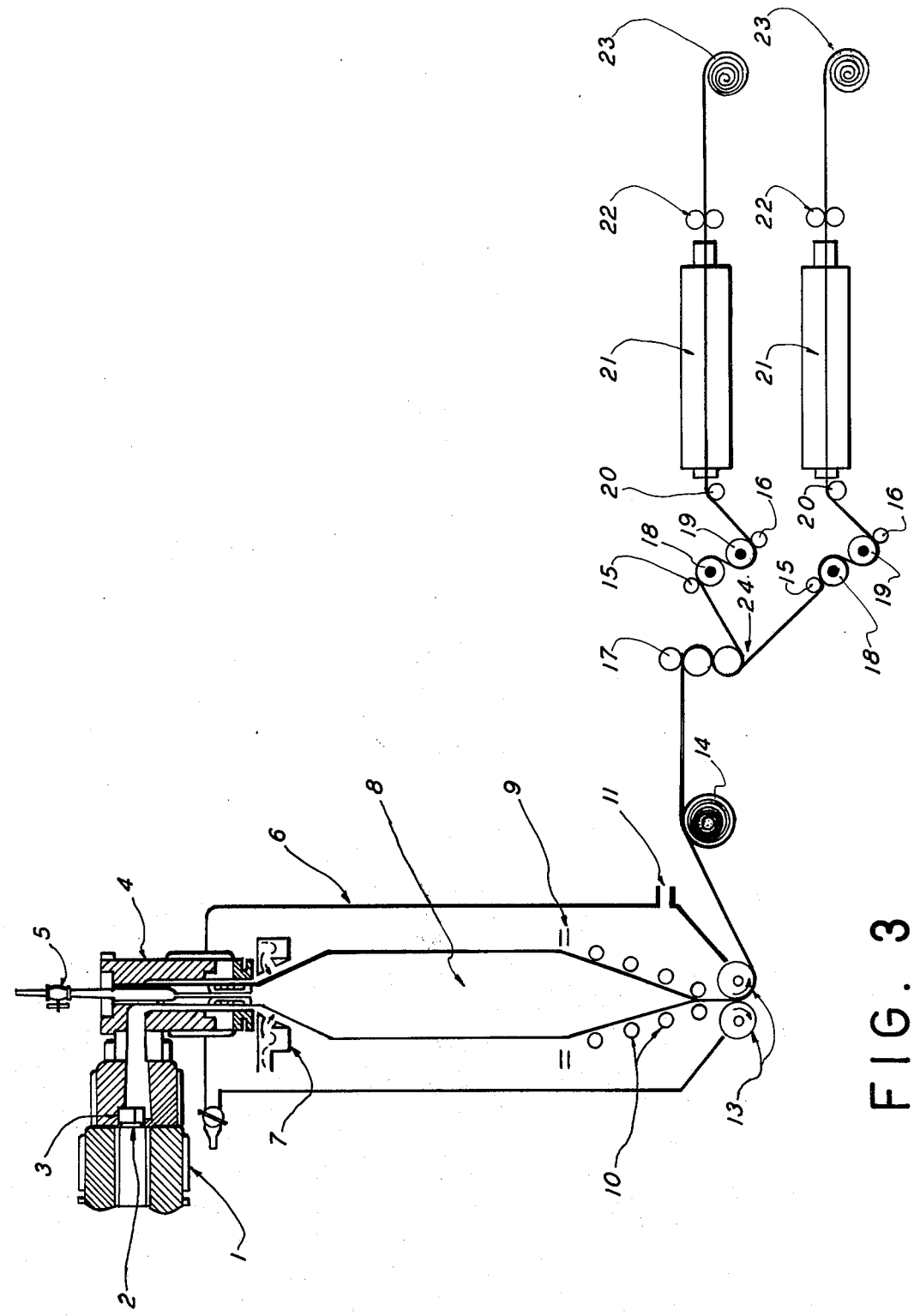

The process of the invention is illustrated in the accompanying drawings in which:

FIG. 1 represents a schematic diagram of suitable equipment for conducting an embodiment of the invention wherein drying of the film is optional and conducted as a separate operation;

FIG. 2 represents a similar schematic diagram of suitable equipment for conducting an embodiment of the present invention wherein drying is part of the continuous processing involved in preparing the flattened tubular film; and FIG. 3 represents a schematic diagram of suitable equipment for conducting a further embodiment of the present invention wherein slitting of the tubular film and drying is part of the continuous processing involved in preparing the film.

In carrying out the process of the present invention, a single phase fusion melt of a suitable acrylonitrile polymer and water is employed. The acrylonitrile polymer is one in which the repeating units are derived from about 68 to 93 weight percent of acrylonitrile and correspondingly, from about 32 to 7 weight percent of one or more monomers copolymerizable with acrylonitrile. In preferred embodiments, it is desirable to employ an acrylonitrile polymer in which the repeating units are derived from about 68 to 93 weight percent of acrylonitrile, from about 1 to 10 weight percent of a hydrophilic monomer and from about 6 to 31 weight percent of a hydrophobic monomer, both the hydrophilic and hydrophobic monomers being copolymerizable with acrylonitrile. The preferred polymer composition generally provides better transparency and structure in the dried film.

The acrylonitrile polymer may be a blend of compatible polymers so long as the blend composition falls within the range of composition given above. The acrylonitrile polymer may be a block copolymer of two or more monomers and may be a graft of one or more monomers onto a preformed polymer provided the final composition is as specified. Useful comonomers for preparing the copolymer composition include the following:

HYDROPHOBIC MONOMERS

Methyl acrylate, ethyl acrylate, butyl acrylate, methoxymethyl acrylate, beta-chloroethyl acrylate, and the corresponding esters of methacrylic and chloracrylic acid; vinyl chloride, vinyl fluoride, vinyl bromide, vinylidene chloride, vinylidene bromide, allyl chloride, 1-chloro-1-bromoethylene; methacrylonitrile; methyl vinyl ketone; vinyl formate, vinyl acetate, vinyl propionate, vinyl stearate, vinyl benzoate; N-vinyl phthalimide, N-vinyl succinimide; methylene malonic esters; itaconic esters; N-vinyl carbazole; vinyl furan; alkyl vinyl ethers; diethyl citraconate; diethyl mesaconate; styrene, dibromostyrene; vinyl naphthalene; 2-methyl-1-vinylimidazole, 4-methyl-1-vinylimidazole, 5-methyl-1-vinylimidazole; and the like.

HYDROPHILIC MONOMERS

Acrylic acid, methacrylic acid, alpha-chloroacrylic acid, itaconic acid, vinyl sulfonic acid, styrene sulfonic acid, methallyl sulfonic acid, p-methoxyallyl benzene sulfonic acid, acrylamidomethylpropane sulfonic acid, ethylene-alpha, beta-dicarboxylic acids and their salts; acrylamide, methacrylamide, dimethylacrylamide, isopropylacrylamide; allyl alcohol; 2-vinylpyridine, 4-vinylpyridine, 2-methyl-5-vinylpyridine; vinylpyrrolidone; vinylpiperidone; 1,2- dihydroxypropyl methacrylate, hydroxyethyl methacrylate; 1-trimethylammonium-2-hydroxypropyl methacrylate methosulfate; and the like.

In preparing acrylonitrile copolymers, it is desirable to employ redox systems such as, for example, sodium persulfate-sodium bisulfite to initiate and control the polymerization. Such usage results in sulfonic end groups on the polymer formed. The proportion of sulfonic end groups in the polymer will vary with molecular weight of the polymer, higher proportions being present in polymers of lower molecular weight. These sulfonic acid end groups have the effect of converting some of the acrylonitrile units into hydrophilic units and should be taken into account when determining the content of hydrophilic monomer in the polymer. Hydrophilic pre-formed polymers such as polyvinyl alcohol, polyvinyl pyrrolidone, polyethylene oxide, polyacrylamide, polyacrylic acid, and the like may be used to provide the acrylonitrile polymer composition. In such case, it is desirable that such pre-formed polymers be added to the monomer composition to be polymerized to provide the acrylonitrile copolymer. The content of repeating units present in the proportion of preformed polymer upon which monomer is grafted is to be taken into account in determining the composition of the resulting copolymer. Individual polymers of the acrylonitrile polymer composition may have weight average molecular weight values in the range of about 10,000 to 200,000 or more so long as the composition is extrudable as a single phase melt with water and provides film of desirable properties. Polymers prepared and purified in accordance with conventional procedures generally have residual unreacted monomer contents of at least about 10 parts per million and generally higher amounts such as several hundred parts per million or more. While it is desirable to employ polymers of low unreacted monomer content, it is not necessary to employ polymers free of unreacted monomer since processing in accordance with the present invention removes unreacted monomer from the polymer by extractive distillation as it is formed into film.

Once a desired acrylonitrile polymer composition has been selected for use in accordance with the above description, it is prepared in the form of a homogeneous single phase fusion melt with water in accordance with prior art teachings. A homogeneous single phase fusion melt of acrylonitrile polymer composition and water results when suitable proportions of polymer composition and water are heated at elevated temperature and pressure sufficient to maintain water in liquid state. The amount of water necessary will vary depending upon the polymer composition employed. For a given polymer composition, there will be a range of water contents that will provide the homogeneous single phase fusion melt at the operating temperature and pressure. This can readily be determined from a phase diagram. Use of too low a water content or temperature will result in a separate phase of unmelted polymer. Use of too high a water content will result in a separate phase of polymer-water melt and an added phase of free water. The fusion melt should be obtained at a temperature safely below the deterioration or decomposition temperature of the polymer composition. Sufficient temperature and mixing should be employed to ensure that a homogeneous fusion melt is obtained. In preferred embodiments wherein the acrylonitrile copolymer composition includes a hydrophilic monomer content, it is desirable to employ an amount of water that is in the lower half of the range of water contents that provide the homogeneous fusion melt at the operating temperature and pressure.

The fusion melt may be conveniently obtained in conjunction with film-forming using a screw extruder coupled with a film-forming die. A suitable procedure for melt extrusion is described in U.S. Pat. No. 3,991,153. Other types of melt-spinning devices may also be used such as, for example, a piston extruder coupled with a film forming die.

The homogeneous single phase fusion melt is extruded through a conventional die having a circular annulus to form a tubular film. This extrusion is done directly into a steam-pressurized solidification zone maintained under conditions of temperature, pressure, and saturation which control the rate of evaporation of water from the nascent film and maintain the film in stretchable state so that the film can be subjected to biaxial orientation while the film remains within the steam-pressurized solidification zone. The conditions to be maintained within the steam-pressurized solidification zone will vary widely depending upon numerous variables such as the polymer composition, the molecular weight of the polymer and the molecular weight distribution, the water content of the single phase fusion melt, and the like. Useful conditions will generally be from about 5 to 125 pounds per square inch gauge and saturated steam is greatly preferred. Typically, saturated steam is used at sufficient pressure to provide a temperature within the solidification zone which is 10° to 50° C. below the minimum melting point of the polymer-water composition.

As the film is formed within the steam-pressurized solidification zone, it is subjected to draw-down by suitable means. This draw-down should be at a level which is at least about twice the rate at which polymer-water melt flows through the film-forming die and preferably is four times or more such rate. This draw-down represents film orientation in the longitudinal direction of the film.

In the annulus of the film-forming die is positioned an inlet for steam and air under pressure and when this inlet is open, the steam and air under pressure will enter the center of the tubular film as it forms. The draw-down means for orienting the film in the longitudinal direction provides a seal at the lower end of the film as it is processed. By entering steam and air under pressure into the tubular body of the film as it forms, the film is expanded radially in the transverse direction and results in transverse orientation. This radial expansion is conducted at sufficient steam-air pressure to at least double the diameter of the initial tube formed and preferably to expand such diameter by a factor of four or more. While it is desirable to effect both longitudinal and transverse orientations at the same levels, this is not necessary since desirable film properties can be obtained when the orientation levels differ to some extent.

It is sometimes desirable to provide a quench of liquid water upon the film as it is being biaxially oriented since such quench can assist in obtaining high levels of orientation. For such purposes it is desirable to use liquid water at or about the temperature prevailing within the solidification zone. Such water may arise as condensate within the solidification zone or may arise from alternative sources. It is convenient to spray the water as a fine mist over the surface of the film at suitable locations, generally at areas where expansion occurs.

After the film has been biaxially oriented within the solidification zone, as indicated, it is ready for removal from the solidification zone. It is convenient to remove the film from the solidification zone as a flattened tube. Suitable guides are provided within the solidification zone so that this flattening of the tube occurs uniformly. The rolls through which the film passes in being flattened may be the same rolls which provide longitudinal orientation. Thus, the actual step which involves flattening of the tubular film is inherent in the process of making a longitudinally oriented film. However, the actual orientation occurs prior to flattening of the film so that the step of flattening the film is a process happening. The flattening step tends to remove excess water from the film and to act as a pressure seal in exiting the film from the steam-pressurized solidification zone.

After the film exits from the solidification zone, the process of the present invention in its simplest embodiment is complete. The film may be stored in moisture-proof containers for subsequent use as an undried film or it may, optionally, be processed further either in continuous or discontinuous processing.

In a preferred embodiment, the film upon exit from the solidification zone is subjected to drying under controlled conditions of humidity. These conditions are indicated by dry bulb temperatures in the range of 110°–180° C. and wet bulb temperatures in the range of 50°–100° C. In carrying out such drying, the film is generally handled using a tenter frame so that the film dimensions are substantially preserved. The drying may be carried out on the flattened tubular film as obtained from prior processing or the film may be slit to provide a single layer of film which is appropriately dried as indicated. If slitting is carried out to provide two single layer films, the two films may be dried on separate tenter frames in the same oven or may be dried in separate ovens. If the separate ovens operate at different drying conditions, two films of different properties can simultaneously be produced in continuous processing.

The process of the present invention will now be described in greater detail with reference to the accompanying drawings. FIG. 1 shows the processing equipment useful for carrying out the process of the present invention in its simplest embodiment. The selected homogeneous single phase fusion melt passes through the screen pack 2 and breaker plate 3 of the extruder 1 through the circular die 4 to form a circular film 8. The film is formed in solidification zone 6 pressurized with steam entering through inlet 11. Steam ring 7 is optional and can supply auxiliary heating to prevent cooling of the nascent film due to evaporation of water therefrom. Steam and air under pressure enter the center of the tubular film through inlet 5 and expand the film transversely. Optional liquid water quench is supplied at 9. Roll seal 13 supplies or transmits longitudinal stretch, seals the tube so that it can be pressurized to expand and provide a pressure seal for exit from the solidification zone. Flattening guides 10 position the expanded film so that it may be uniformly flattened as it passes through the roll seal. The film exiting the solidification zone is taken up on wind-up rolls 14. If it is desired to dry the film prepared, this may be done in separate processing using guide rolls 17, 18, 19, and 20 in conjunction with nip rolls 15 and 16 to feed the film to tenter frame 21 operating under suitable conditions of dry-bulb and wet-bulb temperatures. Tension rolls 22 move the film through the tenter frame to final wind-up roll 23 at a controlled percent allowed shrinkage.

In FIG. 2, the process of the present invention is illustrated in an embodiment wherein drying of the film is part of the continuous process. In this embodiment, the film exiting the solidification zone 6 by means of roll seal 13 proceeds immediately to guide rolls 17, 18, 19, and 20 in conjunction with nip rolls 15 and 16 for passage through tenter frame 21 where it is moved by tension rolls 22 to final wind-up roll 23.

In FIG. 3, the process of the present invention is illustrated in an embodiment wherein drying and slitting of the tubular film is part of the continuous process. In this embodiment, the film exiting the solidification zone 6 by means of roll seal 13 proceeds to slitter 24 and thence to the guide rolls, nips, tenter frame, tension rolls, and final wind-up roll. In the embodiment as shown, the flattened tubular film is split into two sections and each section is passed through separate drying ovens.

The drying step of the process carried out as indicated sets the structure of the film. Prior to drying, transport of water and other volatiles from within the film structure to the outside thereof is possible and it is here that the last remnant of free monomer associated with the acrylonitrile polymer composition is removed in this manner so that the final film is virtually free of unreacted monomer. Such unreacted monomer content is generally contained in condensate recovered from the solidification zone. Appropriate treatment of such condensate will prevent environmental pollution.

The invention is more fully illustrated in the examples which follow wherein all parts and percentages are by weight unless otherwise specified.

EXAMPLE 1

Using the apparatus shown in FIG. 1, a tubular film is prepared using a polymer-water melt supplied by a single-screw extruder having a screw diameter of 2 inches. The polymer is composed of repeating units derived from 85% acrylonitrile and 12% methyl methacrylate grafted onto a preformed polyvinyl alcohol which is used in an amount which provides 3% repeating units of vinyl alcohol in the final polymer composition. The polymer has a weight average molecular weight of about 56,000. The extruder feed consists of 85 parts polymer and 15 parts water. The feed polymer also contains 25 parts per million residual acrylonitrile monomer, i.e., unreacted monomer. The melt is extruded through the circular annulus of a die having an annular diameter of 4 inches, a die width of 20 mils and a die length of 160 mils. The melt temperature at the die is 170° C. The linear velocity of the melt through the die is 5 meters per minute and the nascent film is drawn down at a rate of 10 meters per minute. Steam and air under pressure are introduced into the tubular structure at sufficient pressure to expand the tube diameter by a factor of 2. The temperature in the solidification zone is maintained at 118° C. by the use of saturated steam under pressure. Before the tube contacts the flattening guides it is quenched with a water spray at 118° C. The flattened tubular film exits from the solidification zone by means of the roll seal, and is wound on a roll and stored in a moisture-proof container.

Subsequently, portions of the flattened tubular film prepared as described above are dried in tensioned state in an oven in which the dry bulb temperature is 110° C. and the wet bulb temperature is 75° C. A film of homogeneous structure is obtained which is transparent. Since no solvent is employed in polymer preparation or processing, the film is completely free from residual solvent. The film is also free of unreacted monomer as far as can be determined by present day analytical equipment and detection procedures.

EXAMPLE 2

The apparatus shown in FIG. 2 is employed in a manner similar to that in Example 1. In this run the polymer contains repeating units derived from 89.3% acrylonitrile and 10.7% methyl methacrylate and its weight average molecular weight is 100,000. The melt contains 16 parts water and 84 parts polymer. The melt temperature at the die is 175° C. The melt is extruded through the die at a linear rate of 5 meters per minute and drawn at the rate of 10 meters per minute. Steam and air pressure expand the film by a factor of 2. The solidification zone operates at 118° C.

The flattened wet tubular film exiting the solidification zone is fed directly to a tenter frame where it is tensioned and dried under controlled conditions of temperature and humidity as in Example 1. The resulting film is clear and homogeneous as well as free of any traces of residual solvent or unreacted monomer.

EXAMPLE 3

Example 1 is repeated in every material detail except that the film is drawn at the rate of 20 meters per minute and the steam and air under pressure introduced into the tubular structure are sufficient to expand the tube diameter by a factor of 4.

The resulting film is of a thickness of approximately 1 mil and is transparent and homogeneous, ideally suitable as a barrier film for food storage and preservation.

EXAMPLE 4

Using the apparatus shown in FIG. 3, the procedure of Example 3 is again followed in every material detail except that the die width is 20 mils and the die length is 250 mils and the flattened tubular film after exit from the solidification zone is slit on both sides to provide two continuous film sections which are dried in separate cycles.

In other embodiments, it is possible to slit the flattened tube on one side only and unfold the resulting film prior to drying. Also, the double slit film may be dried on two frames in one oven or on two frames in two ovens. If two ovens are used, variations in temperature, humidity and tension on the film will lead to final films having different thickness, orientation, toughness, and barrier characteristics.

I claim:

1. A process for preparing a biaxially oriented barrier film which comprises preparing a single phase fusion melt of an acrylonitrile polymer and water, said polymer being composed of repeating units derived from about 68 to 93 weight percent acrylonitrile and, correspondingly, 32 to 7 weight percent of one or more monomers copolymerizable with acrylonitrile and containing at least about 10 parts per million of residual monomer; extruding said melt through a circular die to form a tubular film, said extruding being directly into a steam-pressurized solidification zone maintained under conditions of saturation, pressure, and temperature which control the rate of release of water from the nascent film; introducing steam and air under pressure into the tubular film structure as it is formed by the die to expand and stretch the nascent film in the transverse direction while drawing the film in the longitudinal directly so as to provide biaxial orientation while the film remains within the solidification zone; flattening the stretched film for removal from the solidification zone; and removing the flattened film from the solidification zone, said film having a residual monomer content substantially less than that of the acrylonitrile polymer employed.

2. The process of claim 1 wherein the acrylonitrile polymer is composed of repeating units derived from about 68 to 93 weight percent acrylonitrile, from about 1 to 10 weight percent of a hydrophilic monomer and from about 6 to 31 weight percent of a hydrophobic monomer.

3. The process of claim 1 including the additional step of drying the resulting film at a dry bulb temperature in the range of about 110° C. to 180° C. and a wet bulb temperature in the range of about 60° C. to 100° C.

4. The process of claim 2 including the additional step of drying the resulting film at a dry bulb temperature in the range of about 110° C. to 180° C. and a wet bulb temperature in the range of about 60° C. to 100° C.

5. The process of claim 3 wherein said drying is conducted on the film under tension to control shrinkage thereof.

6. The process of claim 4 wherein said drying is conducted on the film under tension to control shrinkage thereof.

7. The process of claim 3 also including the step of slitting the resulting tubular film prior to drying.

8. The process of claim 4 also including the step of slitting the resulting tubular film prior to drying.

9. The process of claim 7 wherein said slitting provides two film sections.

10. The process of claim 8 wherein said slitting provides two film sections.

* * * * *